(12) United States Patent
VonDoenhoff et al.

(10) Patent No.: US 8,719,877 B2
(45) Date of Patent: May 6, 2014

(54) WIRELESS AUDIO TRANSMISSION OF INFORMATION BETWEEN SEATS IN A MOBILE PLATFORM USING MAGNETIC RESONANCE ENERGY

(71) Applicant: The Boeing Company, Chicago, IL (US)

(72) Inventors: Roger C. VonDoenhoff, Federal Way, WA (US); Sudhakar S. Shetty, Mercer Island, WA (US); Donald W. Schultz, Everett, WA (US); William E. Whitesell, Marysville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/928,018

(22) Filed: Jun. 26, 2013

(65) Prior Publication Data
US 2014/0013364 A1   Jan. 9, 2014

Related U.S. Application Data

(63) Continuation of application No. 11/130,557, filed on May 17, 2005, now abandoned.

(51) Int. Cl.
*H04N 21/214* (2011.01)

(52) U.S. Cl.
CPC ............................. *H04N 21/2146* (2013.01)

USPC ............................................................ 725/77

(58) Field of Classification Search
CPC .................................................. H04N 21/2146
USPC ...................................... 725/76–77; 455/41.1
See application file for complete search history.

(56) References Cited

U.S. PATENT DOCUMENTS

| 5,771,438 | A  | 6/1998  | Palermo et al. |
| 6,990,338 | B2 | 1/2006  | Miller et al. |
| 7,769,398 | B2 | 8/2010  | Marston et al. |
| 2005/0039208 | A1 | 2/2005  | Veeck et al. |
| 2005/0259754 | A1 | 11/2005 | Ho et al. |
| 2005/0268319 | A1 | 12/2005 | Brady |

*Primary Examiner* — Bennett Ingvoldstad
(74) *Attorney, Agent, or Firm* — Harness, Dickey & Pierce, P.L.C.

(57) ABSTRACT

A system and method for communicating audio or video information using inductive magnetic coupling between first and second adjacent seats on a mobile platform. A transceiver at the first seat receives signals from an in-flight entertainment (IFE) system. The signals are passed to a transmitter subsystem that generates low power inductive magnetic energy which is received by a receiver subsystem located on the second seat. The energy is converted to electrical signals for generating an output signal to an audio jack associated with a personal control unit (PCU) at the second seat. The audio content can then be used at the second seat together with video content displayed on a video display unit at the first seat, without affecting the synchronization of the audio signals and the video signals.

10 Claims, 3 Drawing Sheets

WIRELESS AUDIO TRANSMISSION OF INFORMATION BETWEEN SEATS IN A MOBILE PLATFORM USING MAGNETIC RESONANCE ENERGY

CROSS REFERENCE TO RELATED APPLICATIONS

This application is a continuation of U.S. patent application Ser. No. 11/130,557 filed on May 17, 2005. The subject matter of the present application is also generally related to U.S. patent application Ser. No. 11/130,549, filed on May 17, 2005. The entire disclosures of each of the above applications are incorporated herein by reference.

FIELD OF THE INVENTION

The present invention relates to the transmission of wireless information between seats in a mobile platform, such as in a commercial aircraft, and more particularly to the transmission of audio information using inductive magnetic energy to wirelessly transmit the information from one seat to another in the mobile platform.

BACKGROUND OF THE INVENTION

On various forms of mobile platforms, and particularly on commercial aircraft, In-Flight Entertainment (IFE) systems are required to send video streams to an aircraft passenger's video display unit, and synchronized audio streams to a headphone jack in a passenger's PCU (Passenger Control Unit) or to some other audio speaker. Typically, the video display is located in the seatback of a seat disposed in a first seat row. The audio signal that is associated with the video content displayed on the video display, however, typically needs to be supplied to an audio jack or speaker that is typically located in a seat in a second seat row behind the first seat. Thus, the video and audio streams must be delivered to two separate network "clients", but still played in near-perfect synchronization. This is considerably different than the typical network or internet situation where the video and sound signals are played on the same client/host apparatus.

In the past, IFE systems have generally been hard-wired systems. The audio and video signals have been delivered as analog or digital signals to one or the other of the first or second seats described above. Feedforward or feedback cables have been used to send the analog signal to the "other half" of the client. For example, if the audio and video signals were delivered to the first seat, then feedback cables were used to supply just the audio signal to the audio jack or speaker associated with the second seat.

With modern systems, there is a strong desire to move towards completely wireless, digital delivery of both video and audio signals to all of the seats within a mobile platform, such as within a commercial aircraft. Often the video and audio streams are compressed before being transmitted from a wireless access point (or points) within the cabin of the mobile platform to the seats. With this arrangement, the video and audio streams must be decompressed/decoded at the "client end" of the network connection (i.e., at least at one seat location). One option would be to send the video and audio streams separately to the two clients (or the combined stream to both clients). However, in that situation the separate decoding at the two clients can lead to audio playout that is out of synch with the video playout. Therefore, it is desirable to decode both video and audio at one client, and then send decoded audio or video to the "other half" of the client (i.e., to the other seat that did not initially receive both streams of information). It would be highly desirable to accomplish the feedforward/feedback of one or the other of video or audio signals without the use of electrical cables. Eliminating the use of electrical cabling for the feedback information stream being transmitted to one of the seats would enable a completely wireless system to be implemented. This would save cost and weight, and reduce the complexity of installation of an IFE system within a mobile platform.

SUMMARY OF THE INVENTION

The present invention is directed to a system and method that enables information to be transmitted from one electronic subsystem associated with the first seat in a mobile platform, to a second subsystem associated with a second seat in the mobile platform, by using inductive magnetic coupling. In one preferred implementation an inductive magnetic transmitter is employed in connection with a first seat. An inductive magnetic receiver subsystem is employed in connection with a second seat that is located closely adjacent the first seat, such as, for example, directly behind the first seat. An RF wireless transceiver in the first seat receives audio/video stream data from an access point located remotely, and decodes the video and audio streams. The video data is sent to the video display in that seat, whereas the audio data is provided to an inductive magnetic transmitter subsystem, which includes an inductive transducer. An inductive magnetic receiver subsystem is located at the second seat which includes an inductive transducer for receiving the inductive magnetic energy from the inductive transducer of the transmitter subsystem located at the first seat. The inductive transducer of the receiver subsystem generates electrical signals that are output to a receiver on the second seat. The receiver generates information that is output to a user accessible component, for example, an audio jack or an audio speaker, associated with the second seat. Advantageously, the inductive magnetic energy transmitted between the transmitter and the receiver subsystem is of very low power and the field strength drops off rapidly with distance from the transmitter. In addition, it operates in a frequency band that is not used by radio frequency communication equipment on board commercial aircraft. For these reasons, it does not give rise to interference problems with other electronic equipment in the vicinity of the first and second seats.

By using the inductive magnetic coupling described above, the video or audio portions, or other information received by the RF transceiver subsystem at the first seat, can be relayed to the receiver subsystem at the second seat without the use of any cables. This enables an entirely wireless system to be implemented with an IFE system. The ability to implement a completely wireless system saves cost, weight and reduces complexity of the installation of an IFE system on a mobile platform.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
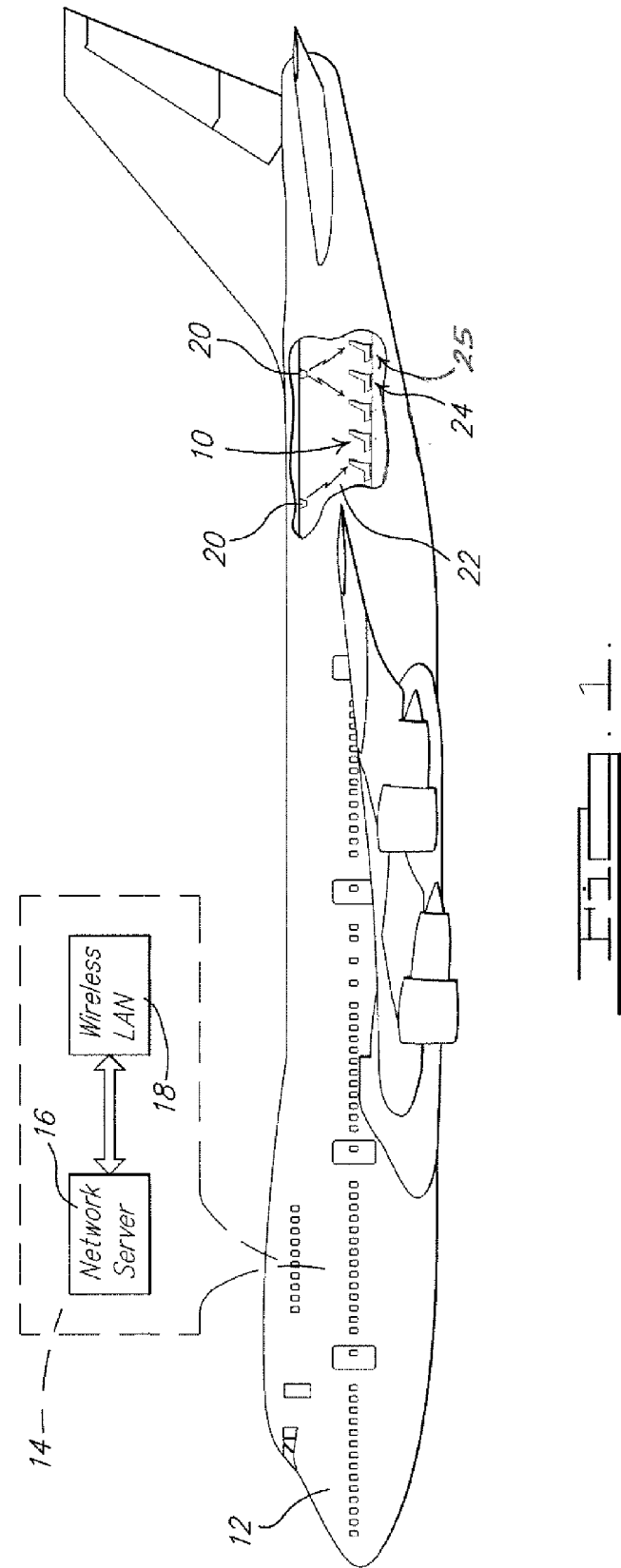
FIG. 1 is a simplified view of a commercial aircraft in which a preferred embodiment of the present invention is implemented, and further illustrating various components that supply information to the seat locations on board the aircraft.

Referring to FIG. 1, a system 10 in accordance with the present invention is illustrated being implemented on a mobile platform, in this example a commercial aircraft 12. It will be appreciated immediately, however, that the system 10 can be readily implemented on a wide variety of other mobile platforms such as ships, trains, buses, rotorcraft, and virtually any other form of mobile platform. The system 10 can just as readily be implemented in terrestrial structures such as theatres, lecture halls, stadiums, etc.

With further reference to FIG. 1, the system 10 typically receives information from an In-Flight Entertainment (IFE) system 14 located on the aircraft 12. The IFE system 14 typically includes at least a network server 16 in communication with a wireless local area network (LAN) 18. The wireless LAN 18 is in communication with a plurality of wireless access points 20 typically spaced apart within a cabin area 22 of the aircraft 12 at overhead locations within the cabin area 22. Typically one wireless access point 20 is used to relay information content to one or a plurality of rows of seats 24 in the cabin area 22. The information, in one form, may comprise both video and audio streams that are received at electronic components at each seat in each seat row, decoded, and presented to the occupants of the seats for use. Two of the seat rows 24 and 25 have been labeled for discussion purposes.

Figure 2:
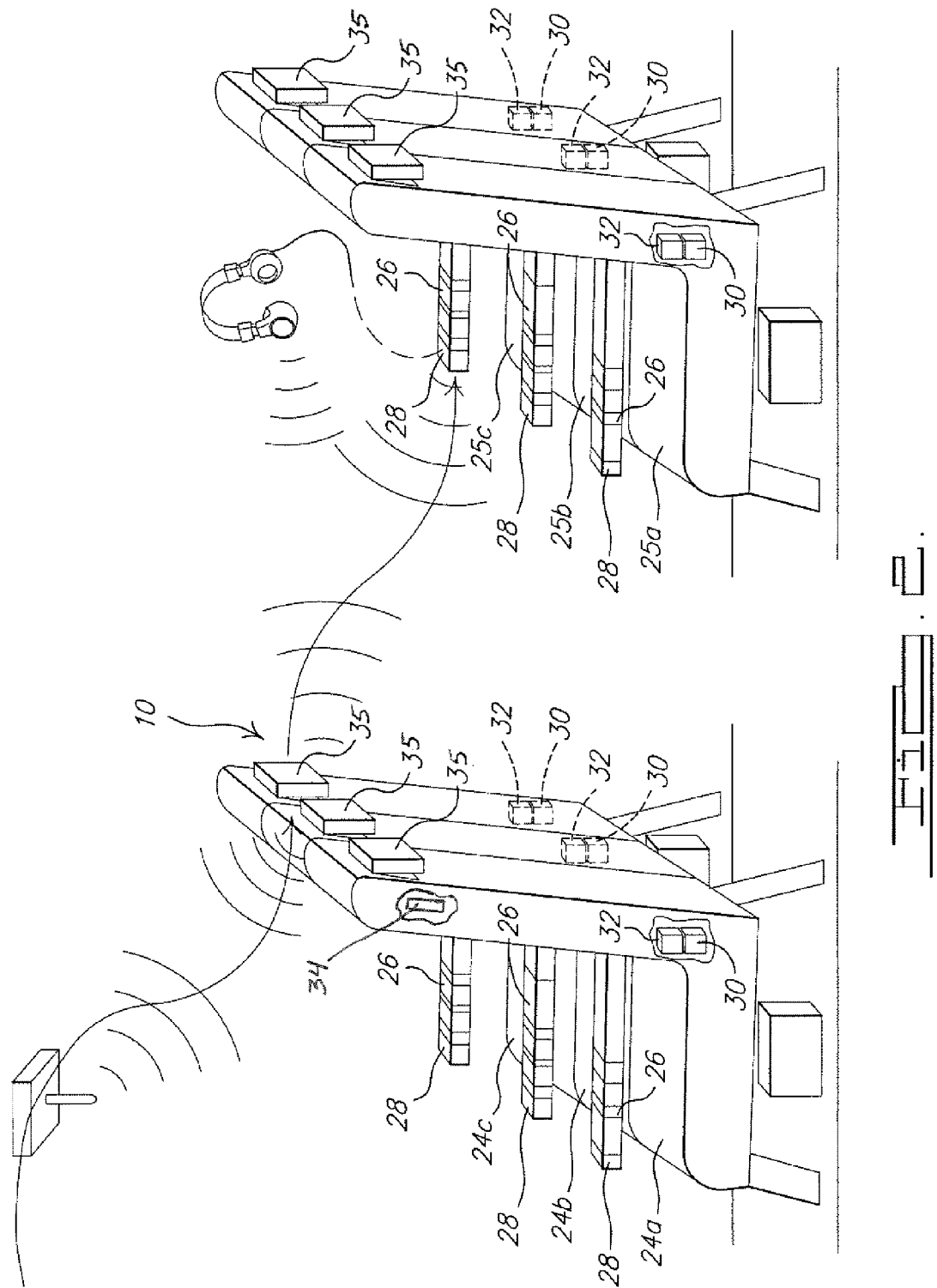
FIG. 2 is a simplified perspective view of a portion of the interior of an aircraft illustrating two seat rows at which a preferred embodiment of the present invention is implemented.

With reference now to FIG. 2, seat rows 24 and 25 are illustrated with the components comprising one preferred implementation of the system 10. In this example seats 24A, 24B, and 24C make up a first seat row and seats 25A, 25B and 25C make up a second seat row. Each seat 24A-24C, 25A-25C includes an armrest 26, and each armrest includes a user accessible personal control unit (PCU) 28. Each seat 24A-24C, 25A-25C also includes an inductive magnetic transmitter subsystem 30 and an inductive magnetic receiver subsystem 32. For the purpose of discussion, only the transmission of information between seat 24A in the first seat row and seat 25A in the second seat row will be described. It will be appreciated, however, that this description applies equally to seat pairs 24B/25B and 24C/25C. Also, the information transmitted between seat pairs 24A/25A, 24B/25B and 24C/25C can be on separate channels to avoid interference. However, a principal advantage of the present invention is that the low power magnetic coupling has two characteristics which enable channels to be reused at seat rows that are two or three rows apart from one another: the signal is transmitted at low power levels, and the magnetic field strength drops off rapidly with distance from the transmitter (generally with the inverse of distance to the sixth power). These factors, along with the fact that the transmitter 30 generally operates at frequencies not typically used by RF communication devices, tend to eliminate the risk of interference that would otherwise be present with higher power RF signals Referring to FIG. 3, the inductive magnetic transmitter subsystem 30 of seat 24A and the inductive magnetic receiver subsystem 32 of seat 25A will be described. Again, it will be appreciated that each subsystem 30 is identical in construction and operation to the other subsystems 30 located on the other seats 24b, 24c, 25b, 25c. Similarly, each receiver subsystem 32 is identical in construction and operation to the others.

An RF transceiver 34 associated with each seat 24, 25 receives the RF information content from one of the wireless access points 20. The video component of this information is transmitted to a video display unit 35. Electronic subsystem 36 receives only the audio portion of the information content from the transceiver 34. The electronic subsystem 36 decodes the audio signals, if the signals are compressed, and generates an output signal that is sent to transmitter 37 and thereby applied to an inductive transducer 38. The inductive transducer 38 generates low power inductive magnetic energy 40 that is transmitted to the receiver subsystem 32 of seat 25A. Since the component pairs 30/32 associated with each seat pair 24A/25A, 24B/25B and 24C/25C can operate on different channels, the magnetic energy 40 does not interfere with communications between seat pairs 24B/25B and 24C/25C.

Figure 3:
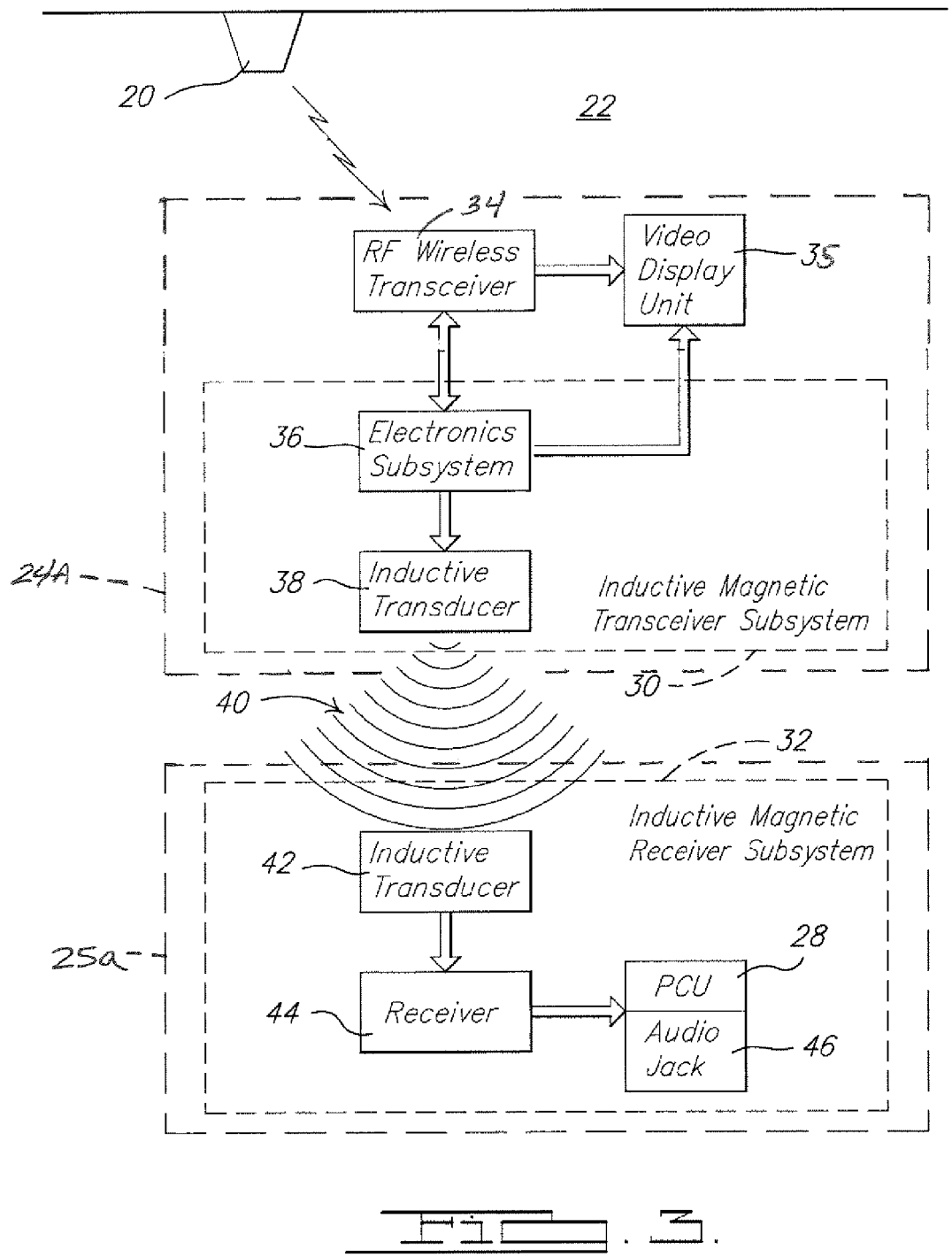
FIG. 3 is a simplified block diagram of a preferred implementation of the present invention.

With continuing reference to FIG. 3, the inductive magnetic energy 40 is received by an inductive transducer 42 of the receiver subsystem 32 at seat 25A. The inductive transducer 42 generates an output signal to a receiver 44 associated with seat 25A which is representative of the information content transmitted via the wireless RF link from the wireless access point 20. This information represents audio signals and is output to an audio jack 46 of PCU 28 of seat 25A. Alternatively, an occupant seated at seat 25A could use a wireless magnetic resonance headset (for example, a noise-canceling headset) that is brought on-board by the occupant, or possibly supplied by the operator of the aircraft 12. In either event, the system 10 operates to "feed back" the audio portion of the content relayed via the RF wireless link using only low power magnetic resonance devices (i.e., subsystems 30 and 32).

In an alternative implementation, the video portion of the signal received at seat 25A could be "fed forward" to seat 24A. With such an implementation, typically the video portion of the wireless RF signal received at seat 25A would be fed forward using inductive magnetic coupling to the seat 24A in front of it. It will be appreciated that other types of electrical signals could just as readily be fed wirelessly between the seat pair 24A/25A and that the system 10 is therefore not limited to transmitting just audio or just video signals.

The various preferred embodiments described herein enable low powered, inductive magnetic coupling between the electronic components of adjacent seat pairs and therefore eliminate the need for cabling to be run between adjacent seat pairs. This significantly simplifies the installation and removal of the seats within a mobile platform, and particularly within a commercial aircraft, where often hundreds of seats may be employed. This enables faster and less costly seat reconfiguration, so that, for example, an airline might find it more cost-effective to change seating configurations seasonally, or an airplane leasing company might more easily configure leased airplanes for different airline customers. The elimination of physical cabling between adjacent seat pairs helps to reduce the overall weight of the mobile platform, as well as the cost of implementing an IFE system.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A system on-board a mobile platform for supplying wireless audio signals and wireless video signals from a source, the wireless video signals presented on a video display associated with a first seat and the wireless audio signals received by a user at a second seat, in a manner so that the wireless audio signals received by the user at the second seat are synchronized with the video signals present on the video display unit that the user is viewing, the video display unit being associated with the first seat, the audio and video signals cooperatively forming information content being viewed and listened to by the user, the system comprising:
  a wireless access point for transmitting a wireless signal having synchronized audio and video components;
  a transceiver associated with the first seat for receiving the wireless signal from the wireless access point and providing only the video component thereof to the video display unit;
  an electronics subsystem associated with the first seat and in communication with the transceiver, the electronics subsystem configured to separate out the audio component from the wireless signal;
  a transmitter subsystem associated with said first seat for receiving the audio component;
  a transducer for generating an inductive magnetic signal representative of the audio component; and
  a receiver subsystem associated with said second seat, wherein said second seat is located adjacent said first seat, the receiver subsystem operable to receive said inductive magnetic signal and to convert said inductive magnetic signal into audio information for use by said user in said second seat, said inductive magnetic signal enabling said audio component to be forwarded as wireless audio information to said second seat wherein the audio component and the video component are substantially synchronized when presenting said information content to the user.

2. The system of claim 1, wherein said receiver subsystem includes a jack for enabling said user to interface an electronic component to said receiver subsystem to receive said audio information signal.

3. The system of claim 1, wherein said electronic component comprises a personal headset for converting said audio information signal into an audio signal.

4. The system of claim 1, further comprising a radio frequency RF transceiver for receiving wireless RF signals from a wireless signal source, the RF signals comprising both audio and video information.

5. A system for transmitting low power, wireless audio signals from a location associated with a first seat on a mobile platform, to a location associated with a second seat positioned adjacent the first seat, so that said audio information corresponding to the wireless audio signals which is presented to a user seated in the second seat is synchronized in time with video information being presented to a video display unit which is facing the second seat but associated with the first seat, and where the video and audio information cooperatively form information content that is able to be viewed and listened to by said user from the second seat, the system comprising:
  a transceiver associated with the first seat and having a transmitter subsystem;
  the transmitter subsystem configured to generate a low power, encoded inductive magnetic signal representative of the audio information, and transmitting said encoded inductive magnetic signal therefrom; and
  a receiver subsystem associated with said second seat for receiving said inductive magnetic signal, and decoding said inductive magnetic signal back into an audio signal to be used by said user of said second seat, and such that both said audio information and said video information are received at the first seat, while enabling said audio information to be forwarded as said inductive magnetic signal in wireless form to said second seat, where the audio information and the video information are substantially synchronized when being presented for use by the user; and
  a component in communication with said RF receiver subsystem for enabling an audio listening device used by said user to be interfaced to said receiver subsystem;
  a network server located on the mobile platform;
  a local area network (LAN) in communication with the network server; and
  a wireless access point in communication with the LAN, the wireless access point being disposed in proximity to the first and second seats, the wireless access point generating wireless RF signals for reception by the transceiver, the wireless RF signals including both the video information and the audio information; and
  wherein said video display unit is positioned on a seatback portion of the first seat so as to be viewable by said user seated in said second seat, and wherein said second seat is positioned directly behind said first seat.

6. The system of claim 5, wherein said component comprises a jack for enabling said user to couple an audio headset to said receiver subsystem.

7. The system of claim 5, wherein said mobile platform comprises a commercial aircraft.

8. A method for communicating audio information received at a first seat on a mobile platform to a second seat on the mobile platform located adjacent the first seat to synchronize the audio information being presented at the second seat with video information being displayed from a video display unit at the first seat, the method comprising:
  from the first seat, generating inductive magnetic signals representative of said audio information and radiating said inductive magnetic signals toward the second seat;
  at the second seat, receiving said inductive magnetic signals and converting said inductive magnetic signals back into said audio information; and
  providing a component for enabling a user of said second seat to listen to said audio information, and such that both the audio and video information is able to be received at the first seat, while said audio information is wirelessly, inductively communicated to said second seat without introducing latency between said video information and said audio information when the audio information is played for the user using the component while the user is seated at the second seat;
  using a network server on board the mobile platform to communicate the audio and video information content;
  using a local area network (LAN) in communication with the network server to interface the users on the mobile platform to the network server;
  using a wireless access point on the mobile platform to communicate with the LAN, the wireless access point being disposed in proximity to the first and second seats, and using the wireless access point to transmit wireless RF signals to an RF transceiver associated with the first seat; and wherein said video display unit is positioned on a seatback portion of the first seat so as to be viewable by said user seated in said second seat, and wherein said second seat is positioned directly behind said first seat.

9. The method of claim 8, wherein providing a component for enabling said user to listen to said audio information comprises providing an audio jack on said second seat for enabling said occupant to interface a personal audio headset to said audio jack.

10. A system for supplying wireless audio signals from a first seat within a first row of seats within a commercial aircraft to a second seat with an adjacent second row of seats within the commercial aircraft, the system comprising:

a local area network (LAN) on said commercial aircraft for wirelessly distributing information content to users on the commercial aircraft, the information content including both video information and audio information needing to be synchronized with one another;

a video display unit located on a seatback portion of said first seat for displaying the video information for viewing by a user seated in said second seat;

a transmitter subsystem supported from said first seat and generating an inductive magnetic signal representative of the audio information input into said transmitter subsystem, said audio information being related to said video information so that the audio information and the video information cooperatively form the information content for viewing and listening by the user;

a receiver subsystem supported from said second seat located adjacent said first seat, the receiver subsystem operating to receive said inductive magnetic signal and to convert said inductive magnetic signal into an audio signal for use by a user seated in said second seat, and such that both the video and audio information is able to be received at the first seat to enable latency between the video information and the audio information to be one of substantially reduced and eliminated when the audio information is presented to the user while the user is seated at the second seat and viewing the video information on the video display unit.

* * * * *